(12) United States Patent
Jacobsen (10) Patent No.: US 12,529,659 B2
(45) Date of Patent: Jan. 20, 2026

(54) METHOD AND APPARATUS FOR DETECTING DEFECTS IN THE SURFACE OF CURVED ARTICLES

(71) Applicant: NORDISCHER MASCHINENBAU RUD. BAADER GMBH + CO. KG, Lübeck (DE)

(72) Inventor: Ulf Jacobsen, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 66 days.

(21) Appl. No.: 18/285,700

(22) PCT Filed: Apr. 6, 2021

(86) PCT No.: PCT/EP2021/058900
§ 371 (c)(1),
(2) Date: Oct. 5, 2023

(87) PCT Pub. No.: WO2022/214159
PCT Pub. Date: Oct. 13, 2022

(65) Prior Publication Data
US 2024/0183791 A1 Jun. 6, 2024

(51) Int. Cl.
*G01N 21/88* (2006.01)
*G01B 11/06* (2006.01)
*G01N 21/84* (2006.01)

(52) U.S. Cl.
CPC ..... *G01N 21/8851* (2013.01); *G01B 11/0608* (2013.01); *G01B 11/0691* (2013.01);
(Continued)

(58) Field of Classification Search
CPC ......... G01N 21/8851; G01N 2021/845; G01N 2021/8874; G01N 2021/8887; G01B 11/0608; G01B 11/0691
See application file for complete search history.

(56) References Cited

U.S. PATENT DOCUMENTS

| 5,973,777 | A | 10/1999 | Nomoto et al. |
| 7,976,368 | B2 * | 7/2011 | Haucke ............... A22C 25/18 452/184 |

(Continued)

FOREIGN PATENT DOCUMENTS

| DE | 102005032244 A1 | 1/2007 |
| DE | 102009036389 A1 | 2/2011 |

(Continued)

OTHER PUBLICATIONS

Search Report dated Aug. 28, 2024 pertaining to Danish patent application No. PA 2023 30310, pp. 1-4.

(Continued)

*Primary Examiner* — Kevin K Pyo
(74) *Attorney, Agent, or Firm* — Dinsmore & Shohl LLP (57) ABSTRACT

A method for automatically detecting surface defects of curved articles of the food processing industry includes: conveying the articles in a conveying direction by a conveyor belt, illuminating the articles by a line laser light source above the belt such that the laser line is oriented transverse to the conveying direction, line-by-line detection of backscattered light while the articles are being conveyed, using a camera above the belt, by recording a line profile in each case, determining raw line height data representing the cross-sectional heights, from the line profile recorded, determining raw surface height data by compiling the raw line height data determined in the conveying direction, determining smoothed surface height data by filtering the raw line height data and/or the raw surface height data using at least one filter criterion, and determining differential height data by subtracting the smoothed data from the raw data. An apparatus is also provided.

34 Claims, 5 Drawing Sheets

(52) U.S. Cl.
CPC .................. *G01N 2021/845* (2013.01); *G01N 2021/8874* (2013.01); *G01N 2021/8887* (2013.01)

(56) References Cited

U.S. PATENT DOCUMENTS

| | | | |
|---|---|---|---|
| 8,035,052 B2 | 10/2011 | Ballina et al. | |
| 10,151,583 B2 | 12/2018 | Lacaze et al. | |
| 11,936,985 B2 * | 3/2024 | Hayashi | H04N 23/695 |
| 2002/0024660 A1 | 2/2002 | Higashi et al. | |
| 2015/0213606 A1 | 7/2015 | Akopyan et al. | |

FOREIGN PATENT DOCUMENTS

| | | | |
|---|---|---|---|
| EP | 2531038 B1 | 12/2013 | |
| JP | H01132333 A | 5/1989 | |
| JP | 2021032686 A | 3/2021 | |
| WO | 8803645 A1 | 5/1988 | |
| WO | 2011070914 A1 | 6/2011 | |
| WO | 2016126835 A1 | 8/2016 | |
| WO | 2018104373 A1 | 6/2018 | |
| WO | 2020161229 A1 | 8/2020 | |
| WO | 2022136386 A1 | 6/2022 | |

OTHER PUBLICATIONS

EP Statement of Facts and Arguments dated Sep. 24, 2025 pertaining to EP patent No. 4319560 issued Dec. 25, 2024, pp. 1-54 (54 pages).
Skjelvareid, M. et al. "Automatic quantification of gaping in fish fillets using 3D imaging—Preliminary results for haddock fillets" Nofima, Nov. 2018, pp. 1-23, Report No. 34/2018, ISBN: 978-82-8296-572-9, ISSN: 1890-579X (23 pages).
"Thresholding (image processing)" Wikipedia, May 13, 2020, pp. 1-4, https://en.wikipedia.org/w/index.php? title=Thresholding_(image_processing)&oldid=956440245 (4 pages).
"Measure properties of image regions" MATLAB regionprops, Sep. 16, 2018, pp. 1-5, https://web.archive.org/web/20180916215842/https://mathworks.com/help/images/ref/regionprops.html (5 pages).
Mittal, H. et al. "A comprehensive survey of image segmentation: clustering methods, performance parameters, and benchmark datasets" Multimedia Tools and Applications (2022), Feb. 9, 2021, pp. 81:35001-35026, https:// doi.org/10.1007/s11042-021-10594-9 (21 pages).
Vision Systems Design, PennWell Corporation, Jun. 2015, pp. 1-52, vol. 20, No. 6, ISSN: 1089-3709 (52 pages).
Leach, R. "Advances in Optical Form and Coordinate Metrology" IOPscience, Dec. 11, 2020, pp. 1-20, DOI: 10.1088/978-0-7503-2524-0 (20 pages).
"Gocator Line Profile Sensors, Gocator 2100, 2300, 2400 Series; Gocator 2880, Firmware version: 5.1.x.xx, Document revision: B User Manual", LMI Technologies, Inc., 2018, pp. 1-750 (750 pages).
"Gocator Line Profile Sensor User Manual - Version 5.1.6.79" Screenshot, Sep. 24, 2025, p. 1, https://lmi3d.com/resource/gocator-line-profile-sensor-user-manual-version-5-1-6, 79/ (1 page).
"Laser scanning using a laser pointing device and a camera" Laser scanning and Triangulation, Feb. 20, 2020, pp. 1-3, https://web.archive.org/web/20200220060728/https:/georgepavlides.info/research/LaserScanningAndTriangulation.php (3 pages).
Pastorius, Dr. W. "Triangulation Sensors An Overview" Optical Gaging Products, LMI Technologies, Inc., Dec. 2014, pp. 1-12, https://web.archive.org/web/20141201175515/http://www.ogpnet.com:80/media/ documents/pdf/whitepapers/triangulationsensors.pdf (12 pages).
"Edge detection" Wikipedia, Feb. 14, 2021, pp. 1-4, https://en.wikipedia.org/w/index.php? title=Edge_detection&oldid=1006777644 (4 pages).
Burden, R et al. "Numerical Analysis" Brooks/Cole Cengage Learning, 2011, pp. 1-4, Ninth Edition (4 pages).
"Truncation" Statistics.com, LLC, Mar. 7, 2021, p. 1, https://web.archive.org/web/20210307215408/https://www.statistics.com/glossary/truncation/ (1 page).
Stetter, H. "Numerical Polynomial Algebra" Society for Industrial and Applied Mathematics, 2004, pp. 1-5 (5 pages).
Palacios, M. "Study Of The Quality Management System And Product Traceability In A Fish Processing Company" United Nations University Fisheries Training Programme, 2001, pp. 1-39 (39 pages).
"Remove small objects from binary image" MATLAB bwareaopen - MathWorks Nordic, Apr. 4, 2018, pp. 1-2, https://web.archive.org/web/20180404182621/https://se.mathworks.com/help/images/ref/bwareaopen.html (2 pages).
Gonzalez, R. et al. "Digital Image Processing" Pearson Education Limited, 2018, pp. 1-8, Fourth Edition (8 pages).

* cited by examiner

METHOD AND APPARATUS FOR DETECTING DEFECTS IN THE SURFACE OF CURVED ARTICLES

CROSS-REFERENCE TO RELATED APPLICATIONS

This application is the U.S. National Stage of PCT/EP2021/058900 filed on Apr. 6, 2021, the entire content is incorporated herein by reference in its entirety.

FIELD OF THE INVENTION

The present invention relates to a method for automatically detecting defects in the surface of curved articles of the food processing industry. The invention furthermore relates to an apparatus for automatically detecting defects in the surface of curved articles of the food processing industry.

Methods and apparatuses of this kind are used in the automatic processing of articles of the food processing industry. The aim is to automatically detect possible defects in articles, in order to thus check, for example, whether the articles correspond to the desired quality requirements. The identification and locating of defects also serves inter alia for providing necessary basic data for automatic subsequent trimming or subsequent processing, in order to be able to cut out or cut off possible defects.

BACKGROUND OF THE INVENTION

Thus, for example the document EP 2 531 038 B1 discloses a food processing device for detecting and cutting off hard tissue from food products. The detection of possible defects takes place, according to the teaching of the document EP 2 531 038 B1, by means of X-ray radiation.

The use of X-ray radiation in quality and defect assessment of articles of the food processing industry is always associated with increased outlay and correspondingly high costs. Since, in order to identify possible defects, X-ray radiation has to x-ray the articles, it is necessary to provide corresponding adjusted conveying devices which are sufficiently permeable for X-ray radiation, at least in the region of the defect identification. In addition, there is outlay and costs for operation and maintenance of the X-ray source, as well as compliance with the safety provisions necessary when dealing with X-ray radiation, in particular those regarding radiation protection. Overall, examination of the articles by means of X-ray radiation is associated with high outlay.

It is therefore the object of the present invention to propose a method which ensures reliable detection of possible defects present in the surface of curved articles of the food processing industry, while at the same time having an apparatus design which is as simple as possible. In particular, the object of the invention is that of ensuring such defect identification without the use of X-ray radiation. Furthermore, the object consists in proposing a corresponding apparatus.

The object is achieved by a method having the features mentioned hereinbefore, in that the method comprises the following steps: conveying the articles in a conveying direction by means of a conveyor belt, illuminating the articles by means of a line laser light source arranged above the conveyor belt such that a laser line generated by means of the line laser light source is oriented transverse to the conveying direction, line-by-line detection of backscattered light while the articles are being conveyed, using a camera arranged above the conveyor belt, by recording a line profile in each case, determining the raw line height data representing the cross-sectional heights, from the line profile recorded, determining raw surface height data by compiling the raw line height data determined in the conveying direction, determining smoothed surface height data by filtering the raw line height data and/or the raw surface height data using at least one filter criterion, determining differential height data by subtracting the smoothed surface height data from the raw surface height data. The camera is preferably configured as a line camera. In particular, cameras of the product series "RANGER" from the company SICK are used.

The method according to the invention has the advantage that possible defects in the surface of curved articles of the food processing industry can be reliably automatically detected, with comparatively low apparatus complexity.

In addition, only light in the visible and/or infrared wavelength ranges is used. A further advantage is that the detection of possible defects takes place only by optical scanning of the surface of the articles to be examined. The articles can therefore be transported on a conventional endless conveyor belt. The optical devices required for automatic detection of the defects are therefore limited to the mentioned line laser light source and the camera.

The camera is in particular configured to in each case record line profiles of the articles illuminated by means of the line laser light source. In other words, the articles are scanned optically, line-by-line. Raw line height data are determined from these line profiles, i.e. a corresponding dataset, corresponding to a height profile along the line, for each line profile which reproduces the brightness distribution of the light portion of the scanned line that is backscattered by the article.

Thus, geometrical data, specifically the respective heights of the articles, measured from the surface of the conveyor belt, are determined for each of the mentioned lines, from the optically recorded line profiles. In the following, a height profile for the entire optically scanned article over the (x,y) plane is determined by determining raw surface height data, which result by compiling the raw line height in the conveying direction. In this case, the x-direction refers to the direction which extends in parallel with the conveying direction, while the y-direction extends at right-angles thereto. For this purpose, for example the belt speed in the conveying direction is detected, or the belt speed is electronically predetermined, such that it is known, at all times, where the article is located and how the raw line heights are compiled to form the mentioned height profile.

SUMMARY OF THE INVENTION

The method according to the invention thus has the advantage that it makes it possible to automatically detect defects in the articles purely by means of optical scanning. Thus, according to the invention, smoothed surface height data are determined from the raw surface height data by means of corresponding filtering. By subsequent generation of differential height data by subtraction of the raw surface height data from the smoothed surface height data, differential height data are determined which provide information relating to possible defects in the articles. Thus, the method according to the invention provides a solution which is associated both with low technical apparatus complexity, and has been found to be particularly reasonable in terms of cost.

An expedient embodiment of the invention is characterised by comparing the differential height data with at least one predetermined threshold value $t_1$ to identify the defects in the surface of the articles and to determine defect data which at least represent the positions of the defects. This has the advantage that the position(s) of possible defects can be identified directly, on the basis of the defect data.

Specifying the mentioned threshold value furthermore makes it possible to adjust the sensitivity of the method according to the invention for identifying possible defects in the articles, to the given circumstances in each case. This allows for reliable and precise detection of possible defects, in particular comfortable adjustment of the trigger threshold at which defects are identified. For example, the sensitivity of the automatic detection of defects can thus be optimally adjusted to the articles to be examined in each case.

A further expedient embodiment of the invention is characterised by scanning the differential height data for clusters and classifying them as defects. This has the advantage that only those regions are detected as defects in which a corresponding accumulation occurs. In this way, the detection of possible defects is particularly resilient to interfering effects. In order for a region to be detected as a defect, the mentioned accumulation must occur in a (two-dimensional) spatial region, in order for this to be clearly detected and identified as such.

A preferred development of the invention is characterised in that the illumination by means of the line laser light source, which is also referred to in the following for short as the laser light source, is carried out obliquely in that the line laser light source is arranged inclined by an illumination angle ranging between 10° and 80° with respect to the normal vector of the conveyor belt.

The oblique position of the laser light source has an advantageous effect on the illumination of the article to be optically scanned, since different article heights lead to a correspondingly greater "deflection" of the laser light line with respect to a laser light baseline extending at the same height, which would appear on an article of a constant height, such that the subsequent determination of the raw line height data experiences a correspondingly higher resolution.

A further expedient embodiment of the invention is characterised in that the line profile is recorded at a recording angle between 15° and 90° with respect to the normal vector of the conveyor belt. In other words, the recording of the line profile takes place either obliquely or in a manner viewing the article from the perpendicular.

According to a further preferred embodiment of the invention, the value of the recording angle is smaller than the value of the illumination angle. This has the advantage that both the illumination of the articles with the laser line, by means of the laser light source, and the viewing of the backscattered light by means of the camera takes place obliquely with respect to the conveying direction. This prevents elevations, i.e. regions of the articles of a greater height, leading to undesired shadowing of the laser light source, which could otherwise lead to interference in the generation of the raw line height data.

A further expedient embodiment of the invention is characterised in that the raw surface height data are compared to a predetermined lower threshold value $t_u$ and, if they are less than the lower threshold $t_u$, are identified as background. Thus, a differentiation is advantageously made between the background, which is formed in particular by the conveyor belt, and an article conveyed thereon. A further advantage is that the edging of the articles can be clearly identified in the surface height data by the separation of the height information from the background and the articles.

A further expedient embodiment of the invention is characterised in that the raw surface height data are compared to a predetermined upper threshold value $t_o$ and, if they are greater than the upper threshold value $t_o$, are identified as measurement errors. In particular by selecting an upper threshold value which is above the maximum height values to be expected, interference caused by measurement errors or artifacts can be reliably ignored. Such inadmissible height values are ignored in this way, and therefore no longer form relevant disturbance values which could disadvantageously influence the further processing.

A further expedient embodiment of the invention is characterised in that the determination of smoothed surface height data and/or raw line height data is performed at least by means of filtering by interpolation. In this way, smoothed surface height data are obtained by means of filtering, which represent quasi an idealised article having a surface that is as smooth as possible. Said hypothetical article determined by means of the smoothed surface height data accordingly does not comprise any local surface unevennesses, but rather a continuously smooth surface, i.e. one which has negligibly small local height changes with respect to the size of the overall article.

According to a further preferred embodiment, the filtering is performed by means of piecewise linear interpolation. This has the advantage of the least possible numerical complexity at sufficient accuracy for calculating the smoothed surface height data.

A further expedient embodiment of the invention is characterised in that the filtering comprises noise/interference suppression. This has the advantage that small signal interferences, in particular those which, according to statistical distribution, which for example act on account of white noise, can be effectively ignored. This prevents such interference leading to incorrect evaluations with respect to the determination of the defect data.

A preferred development of the invention is characterised in that the noise/interference suppression is brought about by morphological filtering. In other words, the noise/interference suppression is brought about in that large structures of the respective raw line height data and/or surface height data are retained, and small structures are removed. In this way, previously existing interference is entirely, or in any case largely, eliminated.

A further expedient embodiment of the invention is characterised by performing an edge detection of the raw line height data and/or the smoothed surface height data to determine the edge of the articles and masking the raw line height data and/or the smoothed surface height data which are located in an edge region, wherein the edge region extends from the edge of the articles up to an edge region boundary spaced apart from this edge by a predetermined edge width, as well as ignoring the masked raw line height data and/or the smoothed surface height data when determining the differential height data.

Advantageously, the outer edge of the relevant article is thus first identified, and proceeding from this identified outside edge an edge region is defined which is subsequently marked out, i.e. is not taken into account in the processing. This is advantageous in particular because, precisely in the edge region of the articles, the rate of change or the gradient of the article height is relatively high. If these were not ignored by masking, as described above, such high rates of change of the article height could possibly result in said edge regions being incorrectly classified as defects. This is reliably excluded by the mentioned method features, and thus overall the robustness of the method according to the invention, with respect to incorrect evaluations, is significantly increased, and reliable defect detection is always ensured.

A further preferred development of the invention is characterised by searching the defect data for defect clusters and identifying those defect clusters whose surface dimensions exceed a predetermined lower area threshold value $tf_u$ and marking them as defects. The specification of a lower area threshold value has the advantage that only those defect clusters are assessed as defects whose surface dimensions are larger than those of the stated threshold value.

It is thus ensured that only such regions are assessed as defects which have a sufficient areal extent. As a result, on the one hand the evaluation is more resilient to possible interference, and on the other hand, specifying the mentioned lower threshold value makes it possible for the classification of whether or not there is a defect to be adjusted to the respective conditions, in particular to the properties of the articles to be studied.

According to a further preferred embodiment, the articles are fish fillets and the defects are possible spaces present in the fish fillets. The present invention is therefore suitable in particular for automatically detecting defects, in the form of spaces, which are also referred to as "gaps," in the surface of fish fillets. The method according to the invention thus makes it possible to fully automatically determine the quality of fish fillets on the basis of the mentioned defects.

A further expedient embodiment of the invention is characterised in that the illumination of the fish fillets is performed with red laser light. The illumination with red laser light has a positive effect in particular on the richness in contrast of the backscattered light, such that the line profiles recorded using the camera can be converted, at a high degree of accuracy, into raw line height data.

A preferred development of the invention is characterised by automatic ejection from the conveyor belt of those fish fillets whose identified defects exceed a predetermined defect threshold value $t_{fs}$. Advantageously, those fish fillets which comprise so many defects that they are not suitable for further processing are thus fully automatically discharged from the production process, or alternatively are supplied to further post-processing.

Furthermore, the object is achieved by a corresponding apparatus having the features mentioned hereinbefore, in that the apparatus comprises a conveying device that is adapted for conveying the articles in a conveying direction by means of a conveyor belt, a line laser light source that is adapted for illuminating the articles and is arranged above the conveyor belt such that a laser line generated by means of the line laser light source is oriented transverse to the conveying direction, a camera which is adapted for line-by-line detection of backscattered or reflected light, which is arranged above the conveyor belt and is configured to record line profiles while the articles are being conveyed, an evaluation device that is adapted for determining raw line height data representing the cross-sectional heights, from the line profile recorded, wherein the evaluation device is furthermore configured for determining raw surface height data by compiling the raw line height data determined in the conveying direction, for determining smoothed surface height data by filtering the raw line height data and/or the raw surface height data using at least one filter criterion, for determining differential height data by subtracting the smoothed surface height data from the raw line conveying device height data.

The advantages associated with the apparatus according to the invention substantially correspond to those which have already been explained in connection with the method according to the invention. Since in particular the evaluation device of the apparatus according to the invention is adapted and configured to carry out the method steps according to the invention, the advantages achieved by the apparatus according to the invention correspond, in the same way, to those of the method according to the invention, to which, in order to avoid repetition, reference is made at this point in connection with the apparatus according to the invention.

A further expedient embodiment of the invention is characterised in that the evaluation device is further configured to compare the differential height data to at least one predetermined threshold value $t_1$ for identifying the defects in the surface of the articles and determining defect data, the defect data at least representing the positions of the defects. Preferably, the positions are specified relative to a selected reference point of each article. Alternatively, the positions can be specified with respect to a stationary coordinate system.

A preferred development of the invention is characterised in that the evaluation device is further configured to search the differential height data for predetermined clusters and to classify them as defects.

A further expedient embodiment of the invention is characterised in that the laser light source is arranged inclined by an illumination angle ranging between 10° and 80° with respect to the normal vector of the conveyor belt.

According to a further preferred embodiment, the camera is arranged such that the line profile is recorded at a recording angle between 15° and 90° with respect to the normal vector of the conveyor belt.

A preferred development of the invention is characterised in that the laser light source and the camera are arranged in such a manner that the value of the recording angle is smaller than the value of the illumination angle.

A further expedient embodiment of the invention is characterised in that the evaluation device is further configured to compare the raw surface height data to a predetermined lower threshold value $t_u$ and, if they are less than the lower threshold value $t_u$, to identify them as background.

A preferred development of the invention is characterised in that the evaluation device is further configured to compare raw surface height data to a predetermined upper threshold value $t_o$ and, if they are greater than the upper threshold value $t_o$, to identify them as measurement errors.

A further expedient embodiment of the invention is characterised in that the evaluation device comprises at least one interpolation filter which is adapted to determine the smoothed surface height data by means of filtering by interpolation.

A preferred development of the invention is characterised in that the interpolation filter is adapted to filter by piecewise linear interpolation.

A further expedient embodiment of the invention is characterised in that the evaluation device comprises a filter configured for noise/interference suppression.

A preferred development of the invention is characterised in that the further filter is configured as a morphological filter.

A further expedient embodiment of the invention is characterised in that the evaluation device comprises an edge detection device which is configured to perform an edge detection of the raw line height data and/or the smoothed surface height data to determine the edge of the articles, and the evaluation device comprises a masking unit which is configured to mask those of the raw height data and/or the smoothed surface height data which are located in an edge region, the edge region extending from the edge of the articles up to an edge region boundary spaced apart from this edge by a predetermined edge width and the evaluation device being adapted to ignore the masked raw line height data and/or the smoothed surface height data when determining the differential height data.

A preferred development of the invention is characterised in that the evaluation device comprises a defect cluster detection unit which is configured to search the defect data for defect clusters and to identify as defects those of the defect clusters whose surface dimensions exceed a predetermined lower area threshold value $tf_u$.

A preferred development of the invention is characterised in that the articles are fish fillets and the defects are possible spaces present in the fish fillets.

A further expedient embodiment of the invention is characterised in that the laser light source provides red laser light.

According to a further preferred embodiment, the invention further comprises an ejection device which is adapted to eject those of the fish fillets from the conveyor belt in which defects have been determined that exceed a predetermined defect threshold value $t_{fs}$.

The advantageous effects of the above-described embodiments of the apparatus according to the invention have also already been explained in detail in connection with the method according to the invention. These also apply analogously.

BRIEF DESCRIPTION OF THE DRAWINGS

Further preferred and/or expedient features and embodiments of the invention can be found in the description. Particularly preferred embodiments are explained in greater detail with reference to the accompanying drawings, in which.

DETAILED DESCRIPTION OF THE INVENTION

The method according to the invention and the apparatus according to the invention are described in greater detail in the following, with reference to the figures.

The method and apparatus allow for the automatic detection of defects in the surface of curved articles of the food processing industry. The articles are preferably those having a non-flat surface, i.e. articles of which the surface is for example largely convexly or concavely curved. The method according to the invention and the apparatus are also suitable for detecting defects in the surface of articles, the surface of which comprises both convex and concave regions. The articles are in particular fish fillets, in which undesired gaps in the surface are intended to be detected. The present invention is not limited only to the identification of such gaps as defects, but rather other types of defects in the surface of curved articles can also be determined.

Figure 1:
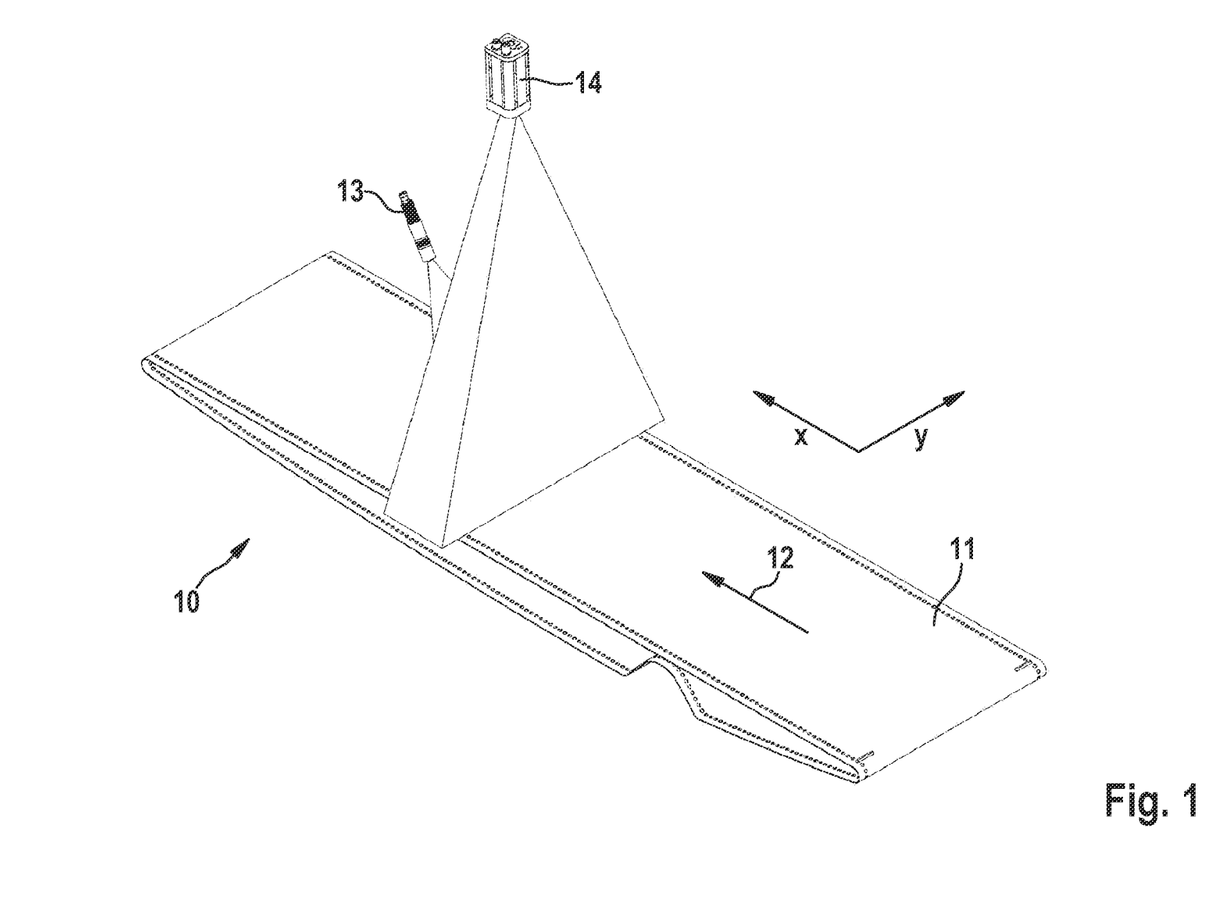
FIG. 1 is a perspective view of the apparatus according to the invention.

FIG. 1 is a perspective view of some components of the apparatus according to the invention.

The articles, not shown in FIG. 1, are conveyed in a conveying direction 12 by means of a conveying device 10 adapted for conveying the articles. For this purpose, the conveying device 10 comprises a conveyor belt 11, preferably an endless conveyor belt driven in a revolving manner. A line laser light source 13 is arranged above the conveyor belt 11. The line laser light source 13 is adapted to illuminate the articles and is arranged in such a manner that a laser line generated by means of the line laser light source 13 is oriented transverse to the conveying direction. The orientation of the line laser light source 13 is preferably selected such that the angle between the laser line and the conveying direction 12 is exactly 90°. Optionally, an angle that deviates herefrom can be set, for example an angle of greater than or equal to 45°.

A camera 14 is arranged above the conveyor belt 11. The camera 14 is configured and adapted to record line profiles 16 during the conveying of the articles. In other words, the camera 14 is configured to optically scan the articles, line-by-line. Each of the line profiles 16 thus comprises brightness values which represent the amount of the back-scattered light along the y-coordinate.

Figure 4:
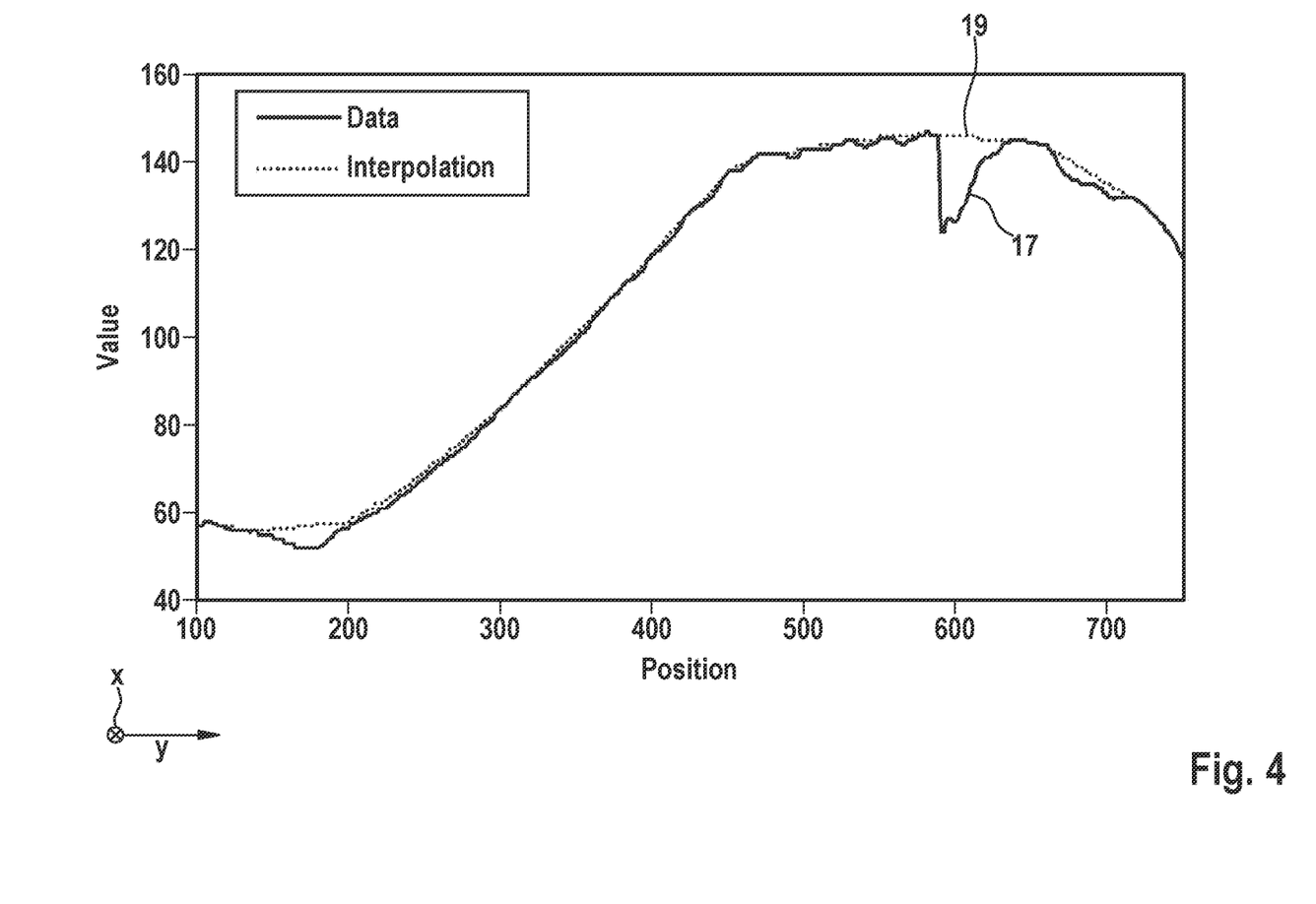
FIG. 4 is a view, by way of example, of raw line height data and smoothed raw surface data.
Figure 5:
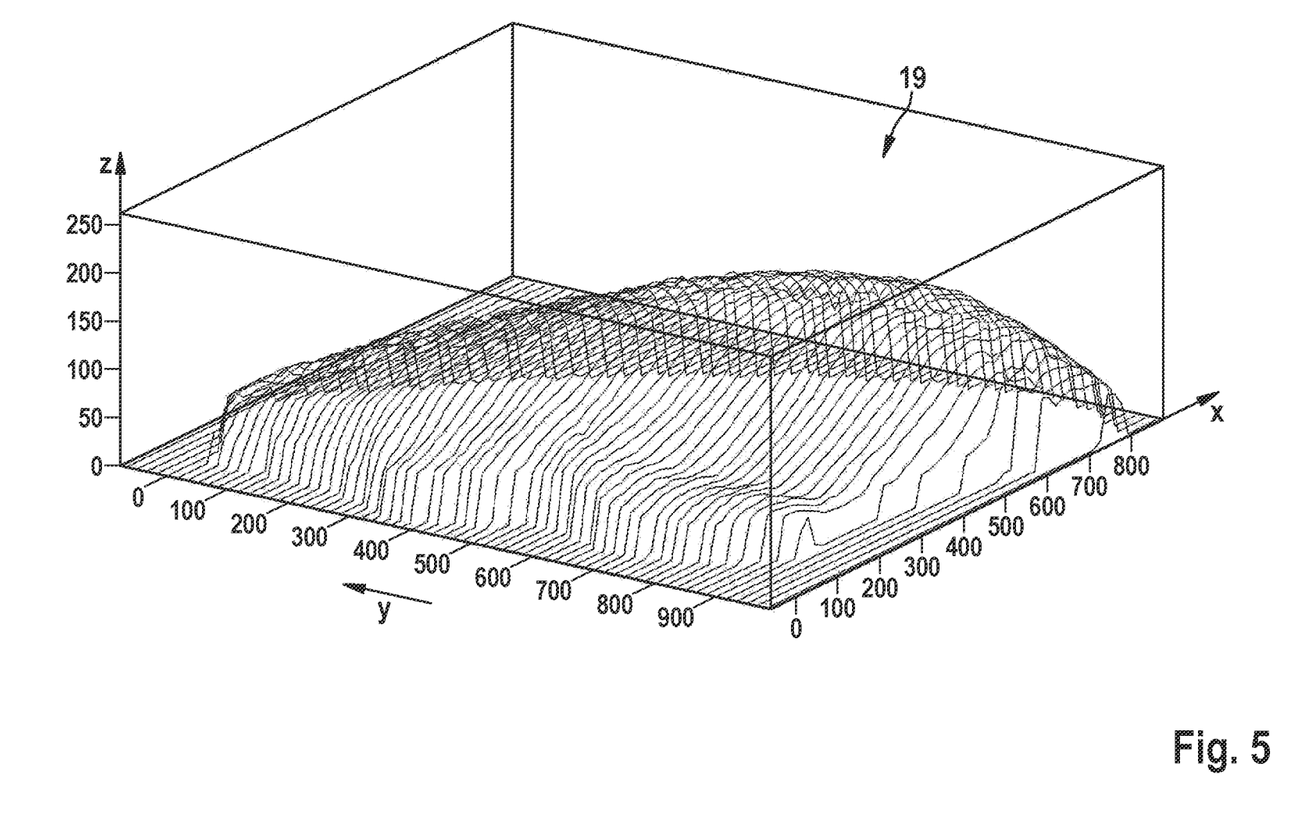
FIG. 5 is a view, by way of example, of smoothed surface height data.

FIG. 4 shows a curve, by way of example, of the raw line height data 17, which is shown in the figure as a continuous line, and denoted by "data" in the key. The abscissa denotes the y-position transverse to the conveyor belt 11, while the ordinate denotes the relevant height value.

Figure 3:
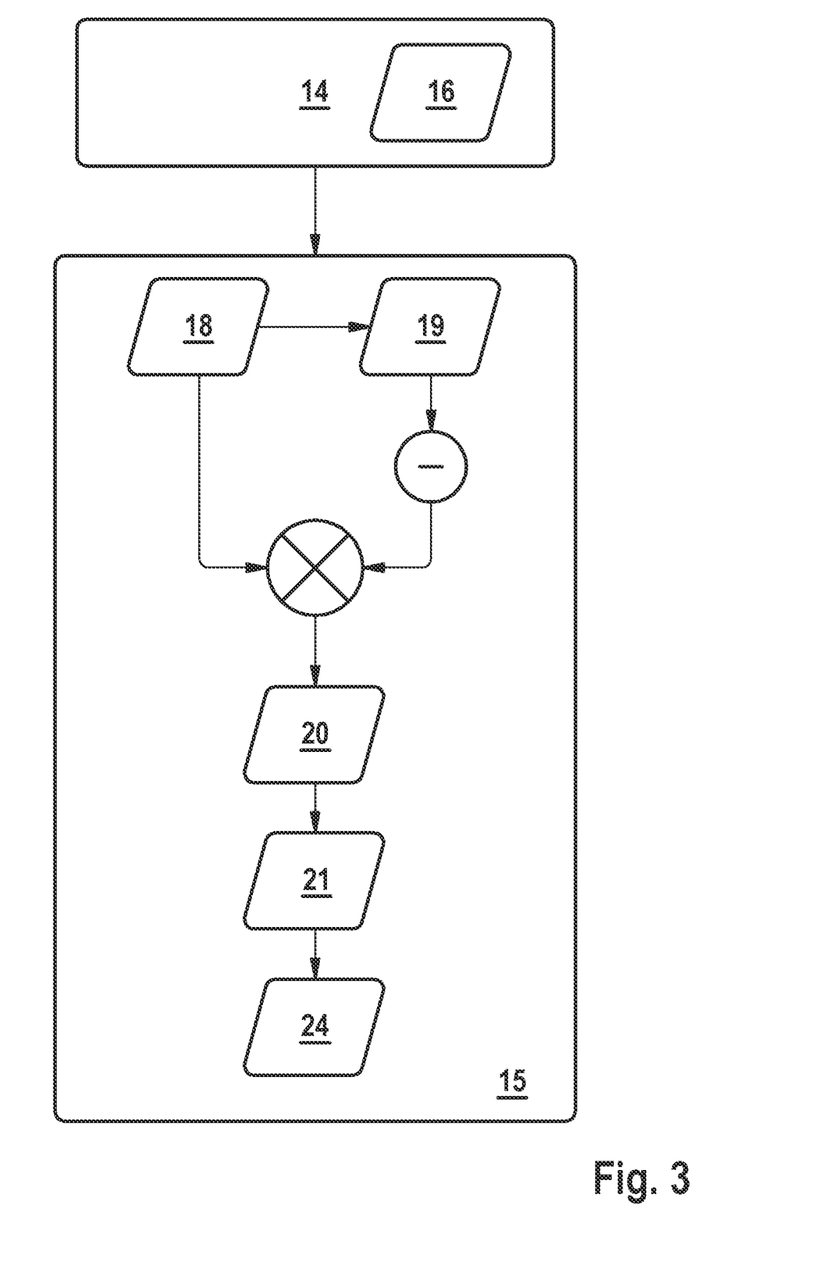
FIG. 3 is a schematic view of a flow diagram for illustrating the determined data.

The recording of the line profiles 16, and the further processing thereof, is explained in greater detail with reference to the flow diagram shown in FIG. 3.

Raw line height data 17 are determined from the recorded line profile 16 by means of an evaluation device 15. The raw line height data 17 represent the cross-sectional heights of the line profile 16, recorded in each case, in the y-direction. The evaluation device 15 is thus adapted to determine a height profile from the line profile 16. The raw line height data 17 thus represent the respective height of the article above the cross section thereof, with respect to the y-direction. In this way, the raw line height data 17 are obtained, i.e. discrete height values $H_{RZ}(y)$ for each y-coordinate $y=n*dy$, where n extends from 0 up to the number of pixels of the camera 14, and dy denotes the spatial resolution or the pixel size of the camera 14 in the y-direction.

The evaluation device 15 is further adapted to determine raw surface height data 18 by compiling the determined raw line height data 17. The raw surface height data 18 denote discrete height values $H_{RO}(y,x)$ over the total scanned surface of the articles.

Raw line height data 17, by way of example, are shown in FIG. 4. As described above, the evaluation device 15 is configured to compile raw surface height data 18 from said raw line height data 17. The raw surface height data 18 thus obtained are shown by way of example in FIG. 4, although only for one line (cf. continuous black line "data").

The evaluation device 15 is furthermore configured to determine smoothed surface height data 19 by filtering the raw line height data 17 using at least one filter criterion. The smoothed surface height data 19 thus obtained are shown by way of example in FIG. 4 as a dotted line and denoted in the legend by "interpolation", again only one line being reproduced in FIG. 4. It is clearly identifiable that the defect located at the y-position "600", which becomes apparent in a locally limited depression in the raw line height data 17, has been filtered out in the smoothed surface height data 19.

The filter criterion should consequently be selected such that locally limited changes in the raw line height data 17 having comparatively large gradients are filtered out. Therefore, preferably interpolation or smoothing filters are used which in particular exhibit a lowpass characteristic.

Creation of the smoothed surface height data 19 is also possible by filtering the raw surface height data 18 by means of the evaluation unit 15. A combination of both filtering methods can also be used, i.e. for example filtering of the raw line height data 17 taking into account adjacent raw line height data 17 with respect to the x-direction.

Finally, the evaluation device 15 is configured to determine differential height data 20 by subtracting the smoothed surface height data 19 from the raw surface height data 18. The smoothed surface height data 19 constitute an idealised surface height profile of the relevant article, as though this were free of defects.

As a result of the difference formation from the raw surface height data 18, which represent the actually determined surface height profile of the respective articles, and the smoothed surface height data 19, possible locally limited defects emerge in the differential heights 20, as values deviating from zero. It is thus possible to locate such defects clearly and precisely, on the basis of the differential height data 20.

The evaluation device 15 is preferably further configured to compare the differential height data 20 to at least one predetermined threshold value $t_1$ for identifying the defects in the surface of the articles in order to determine defect data 21. The defect data 21 represent for example a dataset by means of which all the positions are identified in the case of which the differential height data 20 exceed the predetermined threshold value $t_1$. The defect data 21 thus represent at least the positions of the defects.

Alternatively, the evaluation device is further configured to search the differential height data 20 for clusters and to classify them as defects. The evaluation device is thus adapted to search, in differential height data, for connected locally limited regions of a predetermined spatial minimum or maximum extension, and to classify such regions as clusters. In this way, accumulation points are identified and classified as defects.

Figure 2:
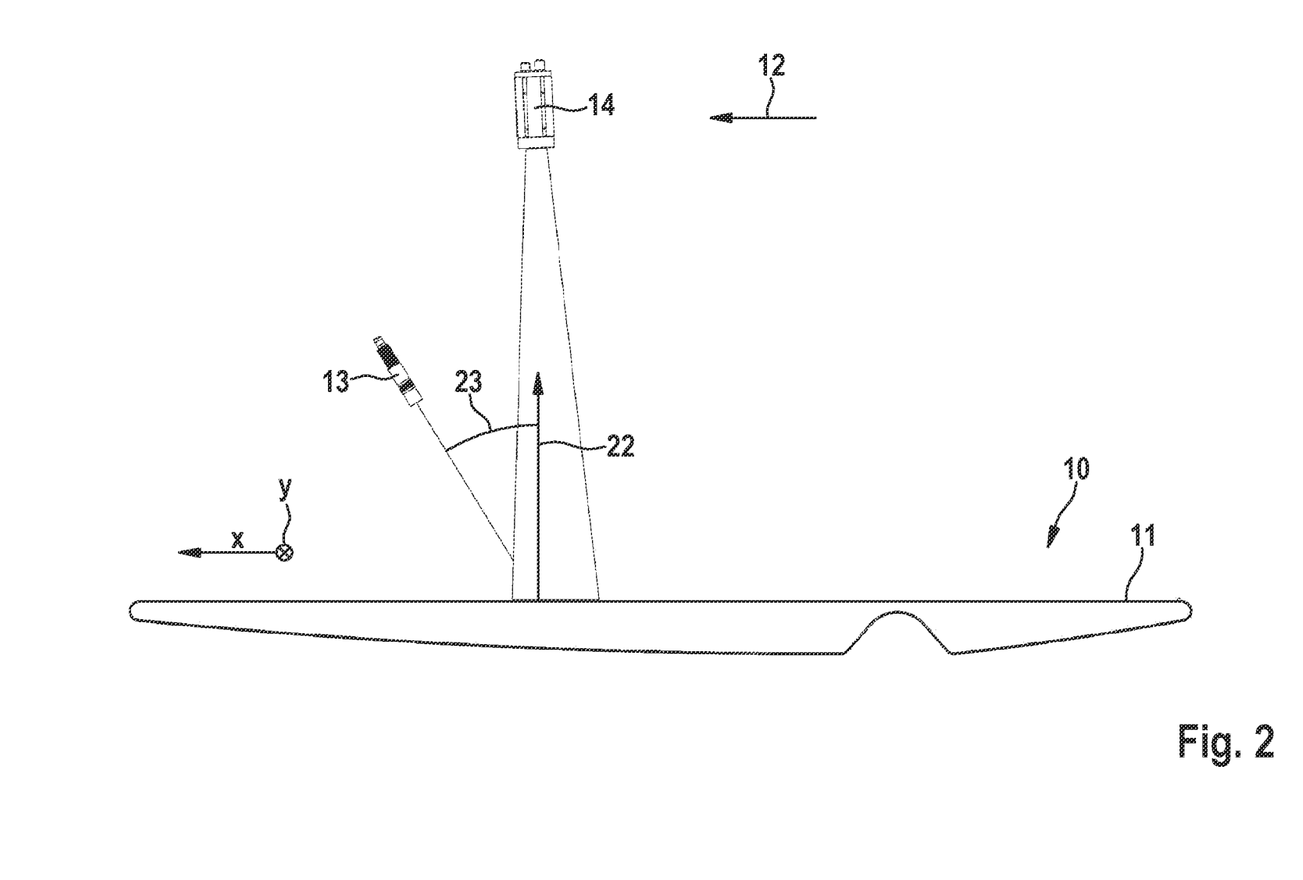
FIG. 2 is a side view of the apparatus shown in FIG. 1.

Further preferably, as is clearly visible in the side view according to FIG. 2, the line laser light source 13 is arranged inclined by an illumination angle 23 ranging between 10° and 80° with respect to the normal vector of the conveyor belt 11. Preferably, the line laser light source 13 is oriented such that it radiates counter to the conveying direction 12.

Advantageously, the camera 14 is furthermore arranged, contrary to the view in FIGS. 1 and 2, such that the line profile is recorded at a recording angle between 15° and 90° with respect to the normal vector 22 of the conveyor belt 11. The camera 14 is further preferably arranged so as to be inclined counter to the conveying direction 12. Advantageously, the laser light source 13 and the camera 14 are arranged in such a manner that the value of the recording angle is greater than the value of the illumination angle 23.

According to an advantageous development of the invention, the evaluation device 15 is further configured to compare the raw surface height data 18 to a predetermined lower threshold value $t_u$ and, if they are less than the lower threshold value $t_u$, to identify them as background. In other words, the evaluation device 15 is configured to mask the raw surface height data 18 which exceed the mentioned threshold value. It is thus possible to clearly distinguish between the background formed by the conveyor belt 11 and those regions in which raw surface height data 18 have been acquired from the respective articles.

Further preferably, the evaluation device is configured to compare the raw surface height data 18 to a predetermined upper threshold value $t_o$ and, if they are greater than the upper threshold value $t_o$, to identify them as measurement errors. The upper threshold value can for example be selected such that it corresponds to a height value which is so large as to be located outside of the maximum height of the articles that is actually to be expected. Thus, possible interference during the detection of the raw surface height data 18 can easily be eliminated. The defect identification is thus numerically more robust overall.

As already described above, the evaluation device 15 comprises at least one interpolation filter which is adapted to determine the smoothed surface height data 19 by means of filtering by interpolation. The interpolation filter is preferably adapted for filtering by piecewise linear interpolation, such that in each case a linear interpolation between two adjacent raw line height data 17 is performed in a piecewise manner.

Further preferably, the evaluation device 15 comprises a filter configured for noise and/or interference suppression. A filter of this kind can be used at various points of the signal or data processing, but in particular for those filtering the raw line height data 17 or the smoothed raw surface height data 19. Further filtering of the smoothed surface height data 19 and of the differential height data is also possible. In particular, the further filter is optionally configured as a morphological filter.

Particularly preferably, the evaluation device 15 comprises an edge detection device. The edge detection is adapted to determine the edge of the articles on the basis of the raw line height data 17 and/or the smoothed surface height data 19. The edge region of the articles refers to a region which extends from the outside edge of the articles as far as an edge region boundary which is spaced apart from said edge by a predetermined edge width. In other words, the edge region refers to a border which extends from the outside edge of the article as far as the centre of the article, and edges the article, i.e. forms a margin.

The evaluation device further comprises a masking unit which is configured for masking those of the raw surface height data 18 and/or of the smoothed surface height data 19 which are located in the edge region. The thus masked raw surface height data 18 and/or the smoothed surface height data 19 are thus ignored when determining the differential height data 20.

The evaluation device 15 preferably comprises a defect cluster detection unit which is configured to search the defect data 21 for defect clusters. For this purpose, the evaluation device 15 evaluates the defect data 21 such that those of the defect clusters whose surface dimensions exceed a predetermined lower area threshold value $tf_u$ are identified as defects.

Specifying the area threshold value $tf_u$ makes it possible to specify which defect clusters are negligibly small with respect to their (two-dimensional) spatial extent, and which are already of a size such that these are to be classified and detected as a defect.

The apparatus according to the invention and the method according to the invention are used in particular in automatic fish processing, in particular when the articles are fish fillets. The apparatus according to the invention, and the method, are suitable in particular for detecting defects on the basis of possible spaces present in the fish fillets.

Further preferably, the line laser light source 13 is adapted such that it provides red laser light.

The apparatus according to the invention further comprises an ejection device (not shown in the drawings). Said ejection device is adapted to eject those of the fish fillets from the conveyor belt 11 in which defects have been determined that exceed a predetermined defect threshold value $t_{fs}$. In other words, the apparatus is configured to eject fish fillets from the production and processing process which exceed a predetermined minimum number of defects.

The invention claimed is:

1. A method for automatically detecting defects in the surface of curved articles of the food processing industry, comprising the steps:
    conveying the articles in a conveying direction by a conveyor belt;
    illuminating the articles by a line laser light source arranged above the conveyor belt such that a laser line generated by the line laser light source is oriented transverse to the conveying direction;
    line-by-line detection of backscattered light while the articles are being conveyed, using a camera arranged above the conveyor belt, by recording a line profile in each case;
    determining raw line height data representing the cross-sectional heights from the recorded line profile;
    determining raw surface height data by compiling the raw line height data determined in the conveying direction;
    determining smoothed surface height data by filtering the raw line height data and/or the raw surface height data using at least one filter criterion; and
    determining differential height data by subtracting the smoothed surface height data from the raw surface height data.

2. The method according to claim 1, further comprising comparing the differential height data with at least one predetermined threshold value $t_1$ to identify the defects in the surface of the articles and to determine defect data which at least represent positions of the defects.

3. The method according to claim 1, further comprising scanning the differential height data for clusters and classifying them as defects.

4. The method according to claim 1, wherein illumination by the laser light source is carried out obliquely in that the laser light source is arranged inclined by an illumination angle ranging between 10° and 80° with respect to a normal vector of the conveyor belt.

5. The method according to claim 4, wherein the line profile is recorded at a recording angle between 15° and 90° with respect to a normal vector of the conveyor belt.

6. The method according to claim 5, wherein a value of the recording angle is smaller than the value of a illumination angle.

7. The method according to claim 1, wherein the raw surface height data are compared to a predetermined lower threshold value $t_u$ and, if the raw surface height data are less than the lower threshold $t_u$, the raw surface height data are identified as background.

8. The method according to claim 1, wherein the raw surface height data are compared to a predetermined upper threshold value $t_o$ and, if the raw surface height data are greater than the upper threshold value $t_o$, the raw surface height data are identified as measurement errors.

9. The method according to claim 1, wherein the determination of smoothed surface height data and/or raw line height data is performed at least by means of filtering by interpolation.

10. The method according to claim 9, wherein the filtering is performed by piecewise linear interpolation.

11. The method according to claim 1, wherein the filtering comprises noise/interference suppression.

12. The method according to claim 11, wherein the noise/interference suppression is brought about by morphological filtering.

13. The method according to claim 1, further comprising performing an edge detection of the raw line height data and/or the smoothed surface height data to determine an edge of the articles and masking the raw surface height data and/or the smoothed surface height data which are located in an edge region, wherein the edge region extends from the edge of each of the articles up to an edge region boundary spaced apart from the edge by a predetermined edge width, as well as ignoring the masked raw surface height data and/or the smoothed surface height data when determining the differential height data.

14. The method according to claim 2, further comprising searching the defect data for defect clusters and identifying those defect clusters whose surface dimensions exceed a predetermined lower area threshold value $tf_u$ and marking the defect clusters as defects.

15. A method for automatically detecting spaces in fish fillets by means of the method according to claim 1, wherein the articles are fish fillets and the defects are possible spaces present in the fish fillets.

16. The method according to claim 15, wherein the illumination of the fish fillets is performed with red laser light.

17. The method according to claim 15, further comprising automatic ejection from the conveyor belt of those fish fillets whose identified defects exceed a predetermined defect threshold value $t_{fs}$.

18. An apparatus for automatically detecting defects in the surface of curved articles of the food processing industry, comprising:
    a conveying device adapted to convey the articles in a conveying direction by means of a conveyor belt;
    a line laser light source adapted to illuminate the articles which are arranged above the conveyor belt in such a manner that a laser line generated by the line laser light source is oriented transverse to the conveying direction;
    a camera adapted to detect backscattered light line-by-line, the camera being arranged above the conveyor belt and configured to record line profiles while the articles are being conveyed;
    an evaluation device adapted to determine raw line height data representing the cross-sectional heights from the recorded line profile, wherein the evaluation device is additionally configured;
        to determine raw surface height data by compiling the raw line height data determined in the conveying direction;
        to determine smoothed surface height data by filtering the raw line height data and/or the raw surface height data using at least one filter criterion; and
        to determine differential height data by subtracting the smoothed surface height data from the raw line height data.

19. The apparatus according to claim 18, wherein the evaluation device is further configured to compare the differential height data to at least one predetermined threshold value $t_1$ for identifying the defects in the surface of the articles and determining defect data, wherein the defect data at least represent the positions of the defects.

20. The apparatus according to claim 18, wherein the evaluation device is further configured to search the differential height data for clusters and to classify the clusters as defects.

21. The apparatus according to claim 18, wherein the line laser light source is arranged inclined by an illumination angle ranging between 10° and 80° with respect to a normal vector of the conveyor belt.

22. The apparatus according to claim 21, wherein the camera is arranged in such a manner that the line profile is recorded at a recording angle between 15° and 90° with respect to a normal vector of the conveyor belt.

23. The apparatus according to claim 22, wherein the line laser light source and the camera are arranged in such a manner that a value of the recording angle is smaller than a value of the illumination angle.

24. The apparatus according to claim 18, wherein the evaluation device is further configured to compare the raw surface height data to a predetermined lower threshold value $t_u$ and, if the raw surface height data are less than the lower threshold value $t_u$, to identify the raw surface height data as background.

25. The apparatus according to claim 18, wherein the evaluation device is further configured to compare the raw surface height data to a predetermined upper threshold value $t_o$ and, if the raw surface height data are greater than the upper threshold value $t_o$, to identify the raw surface height data as measurement errors.

26. The apparatus according to claim 18, wherein the evaluation device comprises at least one interpolation filter which is adapted to determine the smoothed surface height data by means of filtering by interpolation.

27. The apparatus according to claim 26, wherein the interpolation filter is adapted to filter by piecewise linear interpolation.

28. The apparatus according to claim 18, wherein the evaluation device comprises a further filter configured for noise/interference suppression.

29. The apparatus according to claim 28, wherein the further filter is configured as a morphological filter.

30. The apparatus according to claim 18, wherein the evaluation device comprises an edge detection device which is configured to perform an edge detection of the raw line height data and/or the smoothed surface height data to determine an edge of the articles, and the evaluation device comprises a masking unit which is configured to mask those of the raw height data and/or the smoothed surface height data which are located in an edge region, wherein the edge region extends from the edge of each of the articles up to an edge region boundary spaced apart from the edge by a predetermined edge width and the evaluation device is adapted to ignore the masked raw surface height data and/or the smoothed surface height data when determining the differential height data.

31. The apparatus according to claim 18, wherein the evaluation device comprises a defect cluster detection unit which is configured to search the defect data for defect clusters and to identify as defects those of the defect clusters whose surface dimensions exceed a predetermined lower area threshold value $tf_u$.

32. An apparatus for automatically detecting spaces in fish fillets by the apparatus according to claim 18, wherein the articles are fish fillets and the defects are possible spaces present in the fish fillets.

33. The apparatus according to claim 32, wherein the line laser light source provides red laser light.

34. The apparatus according to claim 32, further comprising an ejection device which is adapted to eject those of the fish fillets from the conveyor belt in which defects have been determined that exceed a predetermined defect threshold value $t_{fs}$.

* * * * *